United States Patent [19]
Uetake

[11] 3,973,827
[45] Aug. 10, 1976

[54] INCIDENT LIGHT FLUORESCENCE MICROSCOPE
[75] Inventor: Toshifumi Uetake, Hachiouji, Japan
[73] Assignee: Olympus Optical Co., Ltd., Tokyo, Japan
[22] Filed: July 20, 1973
[21] Appl. No.: 381,092

[30] Foreign Application Priority Data
July 23, 1972   Japan.............................. 47-73702

[52] U.S. Cl. ............................................... 350/91
[51] Int. Cl.² ......................................... G02B 21/16
[58] Field of Search...................... 350/27, 91, 172; 356/251

[56] References Cited
UNITED STATES PATENTS
2,633,051   3/1953   Davis .............................. 356/251
2,780,130   2/1957   Mauer............................... 356/251

FOREIGN PATENTS OR APPLICATIONS
2,021,654   10/1971   Germany

OTHER PUBLICATIONS
Ploem, *Zeitschrift fur Wissenschaftliche Mikroskopie*, vol. 68, 1967, pp. 129–142.

Primary Examiner—John K. Corbin
Assistant Examiner—F. L. Evans
Attorney, Agent, or Firm—Cushman, Darby & Cushman

[57] ABSTRACT

An incident light fluorescence microscope comprising a dichroic mirror of the concave type to enable a person to observe a extremely bright, fog-free and clear image, by making small the incidence angle of the illuminating light to said dichroic mirror.

13 Claims, 7 Drawing Figures

INCIDENT LIGHT FLUORESCENCE MICROSCOPE

BACKGROUND OF THE INVENTION

1. Field of the Invention

The present invention pertains to an improvement in fluorescence microscopes, and more particularly it relates to an improvement in incident light fluorescence microscopes.

2. Description of the Prior Art

Known incident light fluorescence microscopes are arranged, as shown in FIG. 1, so that the light rays coming from a light source 1 which is comprised of a mercury lamp or the like are passed through an exciting filter 2 (which allows only the light rays of a required specific wave length to pass therethrough) and these filtered light rays are then reflected on a dichroic mirror 3 to pass through an objective 5 and then impinge onto the object 6 which is made self-luminous. This object 6 absorbs those light rays having a specific wave length which impinge thereonto and emits light or fluoresces. This fluorescence is passed through the objective lens 5, the dichroic mirror 3 and a barrier filter 7 to be viewed through an eyepiece or eyepieces. In operation, the aforesaid object 6 is used after being dyed with a fluorescent dye. As such a dye, dyes for the fluorescence antibody technique, such as F.I.T.C. (Fluorescein Isothiocyanate) are widely used. Therefore, description will be made on instances where this particular dye is used in dyeing the object. This F.I.T.C. exhibits maximum absorption at the wave length of 490 m$\mu$, and emits maximum fluorescence at the wave length of 520 m$\mu$ which is close thereto. Accordingly, it is desirable to use such a dichroic mirror that reflects as much light rays of 490 m$\mu$ in wave length as possible and that passes as much light rays of 520 m$\mu$ in wave length as possible therethrough. In actual operations, there is being used a multi-layer interference filter which exhibits maximum transmission for the wave length of 520 m$\mu$ and has such a spectral characteristic as will cut off those light rays having wave lengths smaller than that. However, with the known incident light fluorescence microscope having such an optical system arrangement as that shown in FIG. 1, the luminous flux is caused to impinge onto the dichroic mirror 3 at the incidence angle of 45°. Accordingly, in view of the optical property peculiar to such a multi-layer interference filter, it will be noted from the curve $a$ in FIG. 2 that the maximum transmission decreases as compared with the instance of vertical incident light and also that the transmission shows gradual decrease towards those wave lengths smaller than that. In short, as will be clear from the curve $a$ shown in FIG. 2, more than 50 percent of the light rays having the wave length of 490 m$\mu$ (which is equal to the wave length at which F.I.T.C. exhibits maximum absorption) are allowed to pass through the dichroic mirror so that the amount of light reflected decreases. In other words, there will be a substantial loss in the amount of light which illuminates the object to fluoresce. Also, in case of an object having a greater reflection factor, more than 50 percent of the reflected light of the fluorescent object will pass through the dichroic mirror. Such a light which passes through this mirror will give rise to the development of fogs, and there has been the drawback that the resulting image is dark and ambiguous.

SUMMARY OF THE INVENTION

It is, therefore, a primary object of the present invention to provide an improved incident light fluorescence microscope which allows a bright, fog-free and clear image to be viewed.

Another object of the present invention is to provide an incident light fluorescence microscope of the type described which uses a concave dichroic mirror.

Still another object of the present invention is to provide an incident light fluorescence microscope of the type described which has an optical system of illumination arranged so that the flux of illuminating light rays impinges onto the aforesaid concave dichroic mirror at as small an incidence angle as possible.

Yet another object of the present invention is to provide an incident light fluorescence microscope of the type described in which a small-size reflecting mirror is arranged at the light source side of the concave dichroic mirror and closer to the optical axis of the optical system of the microscope.

A further object of the present invention is to provide an incident light fluorescence microscope of the type described in which an auxiliary lens is used to cause the illuminating light flux to be focused in the vicinity of said small-size reflecting mirror.

A still further object of the present invention is to provide an incident light fluorescence microscope of the type described which uses a concave mirror in place of said auxiliary lens.

A yet further object of the present invention is to provide an incident light fluorescent microscope of the type described in which a barrier filter is arranged with an inclination relative to the optical axis of the microscope.

Another object of the present invention is to provide an incident light fluorescence microscope of the type described in which the object is dyed with such a fluorescent dye that the use of a green light is suitable as the exciting light and in which the dichroic mirror is a multi-layer interference filter cutting off those light rays lying on the short wave length side and having a spectral characteristic such that the wave length of those light rays which are passed therethrough at the transmission factor of 50 percent is 605 m$\mu \pm$ 5 m$\mu$, or 590 m$\mu \pm$ 5 m$\mu$.

A still further object of the present invention is to provide an incident light fluorescence microscope of the type described in which the object is dyed with such a fluorescent dye that the use of a blue light is suitable as the exciting light and in which the dichroic mirror is a multi-layer interference filter cutting off those light rays lying on the short wave length side and having a spectral characteristic such that the wave length of those light rays which are passed therethrough at the transmission factor of 50 percent is 505 m$\mu \pm$ 5 m$\mu$.

Another object of the present invention is to provide an incident light fluorescence microscope of the type described in which the object is dyed with such a fluorescent dye that the use of a violet light is suitable as the exciting light and in which the dichroic mirror is a multi-layer interference filter cutting off those light rays lying on the short wave length side and having a spectral characteristic such that the wave length of those light rays which are passed therethrough at the transmission factor of 50 percent is 473 m$\mu \pm$ 5 m$\mu$.

A still further object of the present invention is to provide an incident light fluorescence microscope of the type described in which the object is dyed with such a fluorescent dye that the use of a ultraviolet light is suitable as the exciting light and in which the dichroic mirror is a multi-layer interference filter cutting off those light rays lying on the short wave length side and having a spectral characteristic such that the wave length of those light rays which are passed therethrough at the transmission factor of 50 percent is 410 mµ ± 5 mµ.

The present invention will hereunder be described in further detail on some preferred embodiments by referring to the accompanying drawings.

DETAILED DESCRIPTION OF THE PREFERRED EMBODIMENTS

Figure 3:
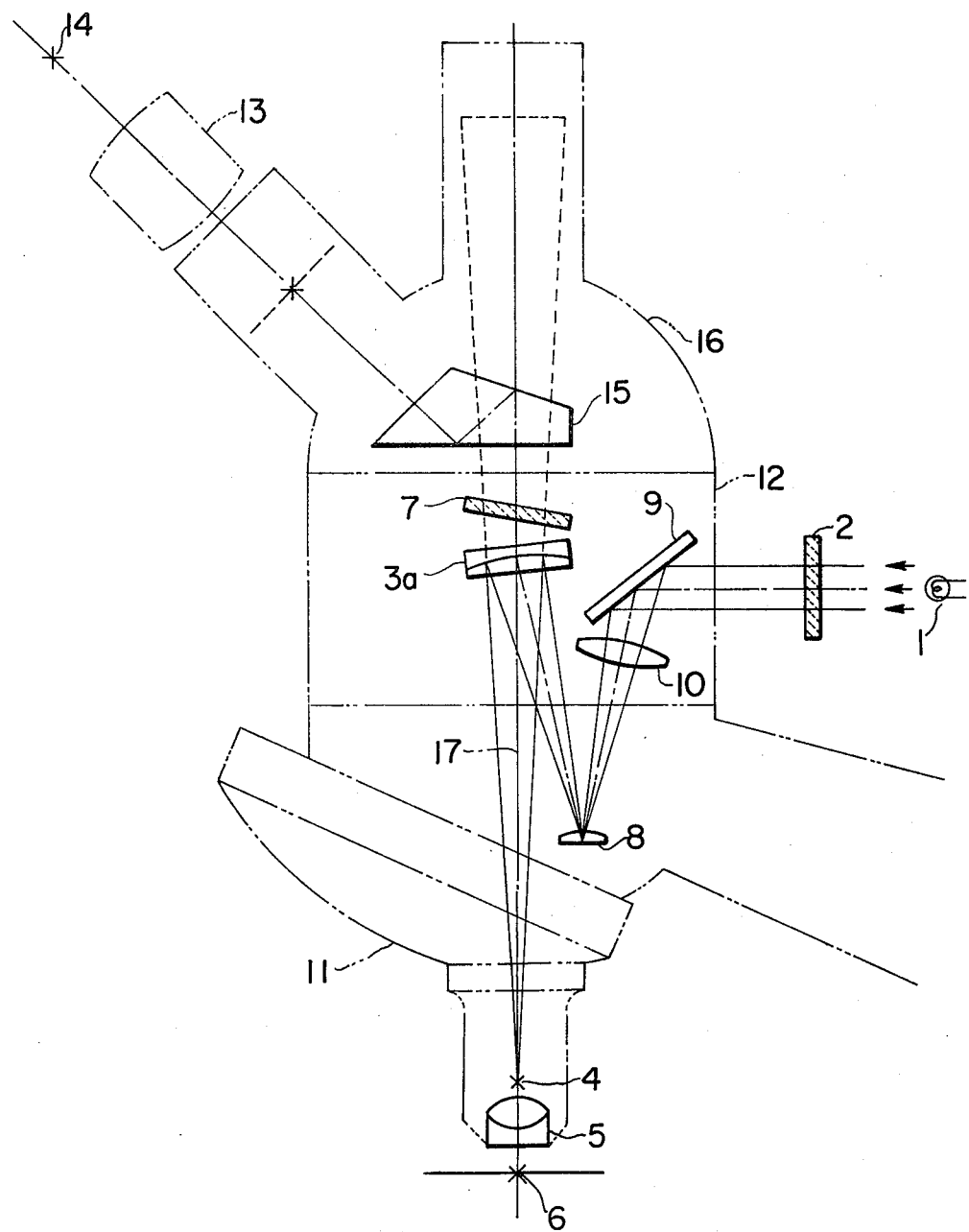
FIG. 3 and 4 are illustrations showing the optical system of the incident light fluorescence microscope according to the present invention.

Referring now to the embodiment shown in FIG. 3, reference numeral 1 represents a light source, numeral 2 represents an exciting filter, numeral 3a represents a concave dichroic mirror, numeral 4 represents the position of back focus of an objective lens 5, numeral 6 represents an object to be caused to self-luminesce, numeral 7 represents a barrier filter, numeral 8 represents a first small-size reflecting mirror, numeral 9 represents a second reflecting mirror, numeral 10 represents an auxiliary lens for illumination, numeral 11 represents a nose-piece revolver, numeral 12 represents a tubular body for light projection, numeral 13 represents an eye-piece, numeral 14 represents the position of exit pupil of the eye-piece 13, numeral 15 represents a prism mounted in an inclined tube, and numeral 16 represents the inclined tube.

The microscope according to the present invention is of the foregoing arrangement. The light rays coming from the light source 1 are passed through the exciting filter 2 and then are reflected by the second reflecting mirror 9 and are focused by the auxiliary lens 10 in the vicinity of the first small-size reflecting mirror 8. Thereafter, the light rays are reflected by the first small-size reflecting mirror 8 and further are reflected by the concave dichroic mirror 3a and are focused as an enlarged image at the position 4 of exit pupil of the objective lens or of back focus of the objective lens 5, thus forming a perfect kohler illumination in cooperation with the objective lens. To this end, the concave dichroic mirror is arranged with a slight inclination relative to the optical axis of the microscope. However, the deflection of the optical axis resulting from this arrangement may be corrected by positioning the barrier filter 7 with an inclination relative to the optical axis. It should be understood that in this embodiment the first small-size reflecting mirror 8 positioned at the light source side of the concave dichroic mirror 3a has an effective diameter which may be smaller than that of said concave dichroic mirror 3a. Therefore, said first small-size reflecting mirror 8 may be arranged in the vicinity of the optical axis of the optical system of the microscope. Accordingly, the angle of incidence of the illuminating light flux onto the concave dichroic mirror 3a can be arranged to be extremely small. In an example of actual design, it was possible to introduce the flux of illuminating light to the concave dichroic mirror 3a at the incidence angle of about 6°. It should be understood also that the second reflecting mirror 9 may be a concave mirror as shown in another embodiment which will be described later. This latter reflecting mirror may not be employed. It should be noted, however, that in case this second reflecting mirror 9 is not employed, the light source requires to be provided obliquely. Thus, in view of factors such as the service life of the light source, it is preferred that this second reflecting mirror 9 be employed. Also, in this embodiment, it will be understood from the drawings that the first small-size reflecting mirror 8 is constructed of a mirror face provided on the planar side of a plano-convex lens and is arranged so that the convex face thereof faces upwardly. It will be clearly understood that a function which is exactly the same as that exerted by the above-mentioned arrangement may be obtained from the following arrangement wherein a mirror face is provided on the concave side of a plano-concave lens and wherein its concave face is directed upwardly. It should be understood also that, while it is possible to provide the first small-size reflecting mirror 8 in the form of a planar mirror, the adoption of a plano-convex lens type as shown in FIG. 3 is preferred for the following reasons. That is to say, the arrangement that the concave dichroic mirror 3a has a gentle curvature by having a portion of its convergence of light rays borne by said first small-size reflecting mirror 8 will contribute to the reduction of the adverse effect on the image arising from inclining this dichroic mirror 3a relative to the optical axis of the microscope.

Figure 1:
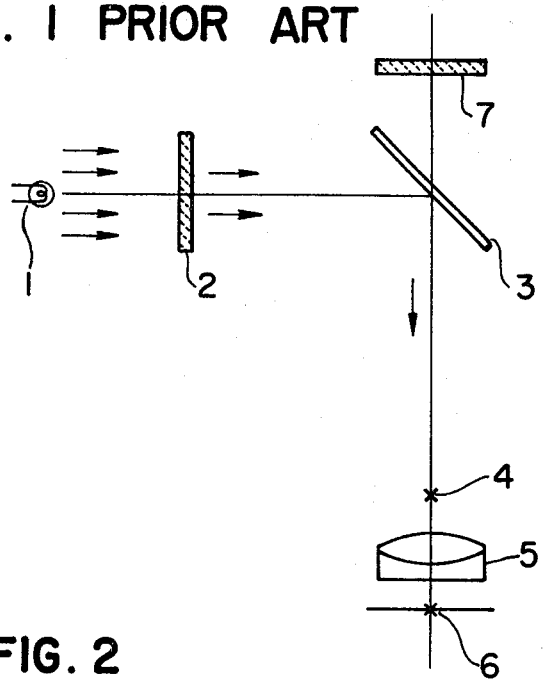
FIG. 1 is an illustration showing the optical system of a known incident light fluorescence microscope.
Figure 2:
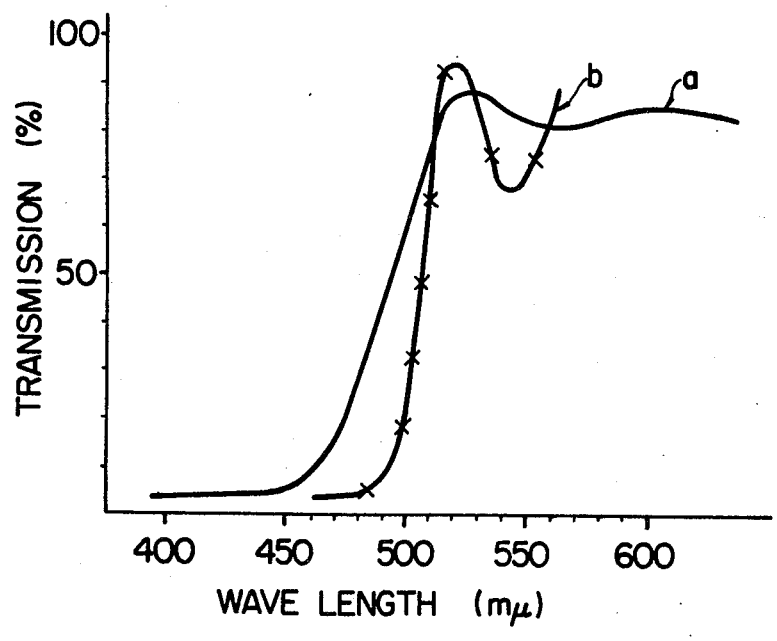
FIG. 2 is a chart showing the spectral transmission factors of dichroic mirrors used in incident light fluorescence of microscopes.

Next, the curve b in FIG. 2 shows the spectro-transmission in the instance wherein light rays are introduced onto the dichroic mirror at the incidence angle of 6°. As is clearly understood from this curve b, there is noted a spectro-transmission which is substantially the same as that for vertical incidence. More specifically, an extremely small transmission is noted at the wavelength of 490 mµ, whereas an extremely great transmission is observed at 520 mµ. Accordingly, by the use of an incident light fluorescence microscope of the present invention arranged so that light rays are introduced to the dichroic mirror at the incidence angle of about 6°, it is apparent that a bright, fog-lens and clear image can be observed.

Figure 4:
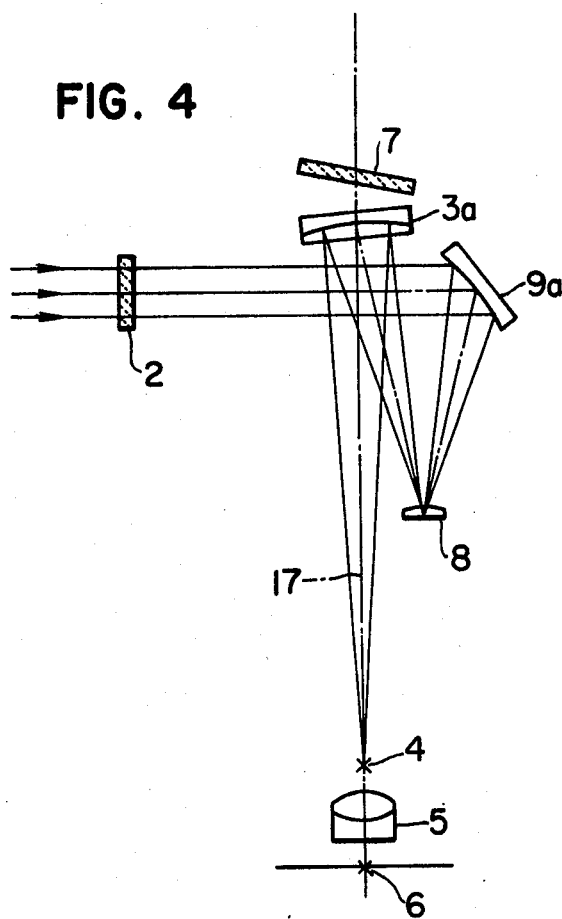

In FIG. 4, there is shown another embodiment of the present invention.

As will be clear from this Figure, both the light source and the exciting filter 2 are positioned opposite to the first small-size reflecting mirror 8 and to the second reflecting mirror 9 relative to the optical axis of the microscope. Also, the second reflecting mirror 9 is provided in the form of a concave mirror to function in the same way as that of the auxiliary lens 10 for illumination which is used in the first embodiment shown in FIG. 3. It should be understood that the objects of the present invention may be attained in the instance wherein the auxiliary lens 10 in the first embodiment is not used or in the instance wherein the second reflecting mirror in the second embodiment is provided in the form of a planar mirror. However, the use of these members is preferred because a better effect can be obtained.

It should be noted further that, for an object dyed with F.I.T.C., a fluorescent dye suitable for the use of the blue light as the exciting light (note: other than F.I.T.C., dyes having similar nature include Quinacrin Mustard, Fluorescence Sodium, etc.), as shown by $b$ in FIG. 2, the use of a dichroic mirror comprised of a multi-layer interference filter which cuts off those light rays having wave lengths lying on the short wave length side and which has such a spectral characteristic that the wave length of the light rays which are passed therethrough at the transmission factor of 50 percent is 505 m$\mu$ is the optimum; for an object dyed with Tetraethyl Rhodamine Compound, Tetraethyl Rhodamine Isothiocyanate, etc., fluorescents dyes suitable for the use of green light as the exciting light, the use of a dichroic mirror comprised of a multi-layer interference filter which cuts off those light rays having wave lengths lying on the short wave length side and which has such a spectral characteristic that the wave length of the light rays which are passed therethrough at the transmission factor of 50 percent is 605 m$\mu$, or 590 m$\mu$ is the optimum; for an object dyed with Serotonin, etc., a fluorescent dye suitable for the use of violet light as the exciting light, the use of a dichroic mirror comprised of a multi-layer interference filter which cuts off those light rays having wave lengths lying on the short wave length side and which has such a spectral characteristic that the wave length of the light rays which are passed therethrough at the transmission factor of 50 percent is 473 m$\mu$ is the optimum; and for an object dyed with Catecholamine, etc., a fluorescent dye suitable for the use of ultraviolet light as the exciting light, the use of a dichroic mirror comprised of a multi-layer interference filter which cuts off those light rays having wave lengths lying on the short wave length side and which has a spectral characteristic that the wave length of the light rays which are passed therethrough at the transmission factor of 50 percent is 410 m$\mu$ is the optimum.

Figure 5A:
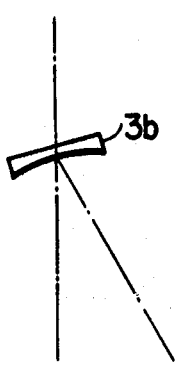
FIGS. 5A, 5B and 5C are different illustrations showing the concave dichroic mirror according to the present invention, respectively.
Figure 5B:
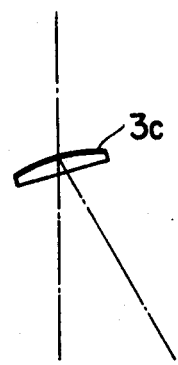
Figure 5C:
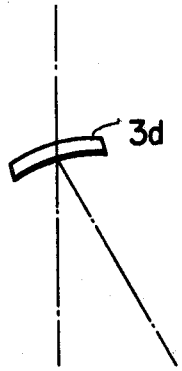

In FIGS. 3 and 4, there are shown concave dichroic mirrors each representing an arrangement of the dichroic mirror formed at the face of junction between a plano-concave lens and a plano-convex lens. Other than these, there can be considered also a different arrangement such that a dichroic mirror is formed on the concave face of a plano-concave lens with its concave face directed downwardly as shown by reference numeral 3$b$ in FIG. 5A, or that a dichroic mirror is formed on the convex face of a plano-convex lens with its planar face directed downwardly as shown by reference numeral 3$c$ in FIG. 5B or that a dichroic mirror is formed on the concave face side of a concave-convex lens with its concave face directed downwardly as shown by reference numeral 3$d$ in FIG. 5C. It should be understood also that the positional arrangement of the light source 1, the exciting filter 2, the concave dichroic mirror 3$a$, the first small-size reflecting mirror 8, the second reflecting mirror 9, the barrier filter 6 or the like may be altered within the scope of the objects of the present invention.

I claim:

1. An incident light fluorescence microscope comprising a light source means for generating an exciting illumination, an objective lens having an optical axis, an object position at which a fluorescent object on the objective optical axis on one side of said objective lens is positioned, a concave-type dichroic mirror positioned along the objective optical axis on the other side of the objective lens, said concave-type dichroic mirror being inclined at a relatively small angle with respect to the objective optical axis and reflecting means positioned adjacent the objective optical axis for reflecting the exciting illumination into said concave-type dichroic mirror at a relatively small angle with respect to the objective optical axis so that the angle of incidence is small, said dichroic mirror in turn reflecting the exciting illumination along the objective optical axis to excite the object to fluoresce, said concave-type dichroic mirror functioning to transmit the fluorescent light imaged on it from the object by the objective.

2. An incident light fluorescence microscope according to claim 1, in which an enlarged image of said light source means is focused in the vicinity of the position of the back focus of said objective lens by means of said concave type dichroic mirror.

3. An incident light fluorescence microscope according to claim 1, in which said reflecting means is comprised of a mirror face provided on the planar side of a plano-convex lens with its convex face directed toward said concave-type dichroic mirror.

4. An incident light fluorescence microscope according to claim 1, in which said reflecting means is comprised of a mirror face provided on the concave side of a plano-concave lens with its concave face directed toward said concave-type dichroic mirror.

5. An incident light fluorescence microscope according to claim 1, in which said microscope further comprises a reflecting mirror being provided between said light source means and said reflecting means.

6. An incident light fluorescence microscope according to claim 5, in which said reflecting mirror is comprised of a concave mirror.

7. An incident light fluorescence microscope according to claim 1, in which said microscope comprises an auxiliary lens being provided between said light source means and said reflecting means.

8. An incident light fluorescence microscope according to claim 1, in which said light source means generates green exciting illumination for use with an object which is dyed with a fluorescent dye suitable for using green light as the exciting light and said concave dichroic mirror suitable for the object dyed with said dye is a multi-layer interference filter which cuts off light rays having wave lengths lying on the short wave length side and which has such a spectral characteristic that the wave length of the light rays which are passed therethrough at a transmission factor of 50 percent is 605 m$\mu$ ± 5m$\mu$.

9. An incident light fluorescence microscope according to claim 1, in which said light source means generates blue exciting illumination for use with an object which is dyed with a fluorescent dye suitable for using blue light as the exciting light and said concave dichroic mirror suitable for the object dyed with said dye is multi-layer interference filter which cuts off light rays having wave lengths lying on the short wave length side and which has such a spectral characteristic that the wave length of the light rays which are passed therethrough at a transmission factor of 50 percent is 505 m$\mu$ ± 5 m$\mu$.

10. An incident light fluorescence microscope according to claim 1, in which said light source means generates violet exciting illumination for use with an object which is dyed with a fluorescent dye suitable for using violet light as the exciting light and that said concave dichroic mirror suitable for the object dyed with said dye is a multi-layer interference filter which cuts off light rays having wave lengths lying on the short wave length side and which has such a spectral characteristic that the wave length of the light rays which are passed therethrough at a transmission factor of 50 percent is 473 m$\mu$ ± 5 m$\mu$.

11. An incident light fluorescence microscope according to claim 1, in which said light source means generates ultra violet exciting illumination for use with an object which is dyed with a fluorescent dye suitable for using ultra-violet light as the exciting light and that said concave dichroic mirror suitable for the object dyed with said dye is a multilayer interference filter which cuts off light rays having wave lengths lying on the short wave length side and which has such a spectral characteristic that the wave length of the light rays which are passed therethrough at a transmission factor of 50 percent is 410 m$\mu$ ± 5 m$\mu$.

12. An incident light fluorescence microscope according to claim 1, further comprising a barrier filter arranged on the objective optical axis on the side of said concave type dichroic mirror opposite that on which the objective lens is situated.

13. An incident light fluorescence microscope according to claim 1, in which said light source means generates green exciting illumination for use with an object which is dyed with a fluorescent dye suitable for using green light as the exciting light and said concave dichroic mirror suitable for the object dyed with said dye is a multi-layer interference filter which cuts off light rays having wave lengths lying on the short wave length side and which has such a spectral characteristic that the wave length of the light rays which are passed therethrough at a transmission factor of 50 percent is 590 m$\mu$ ± 5 m$\mu$.

\* \* \* \* \*